United States Patent Office 3,089,377
Patented May 14, 1963

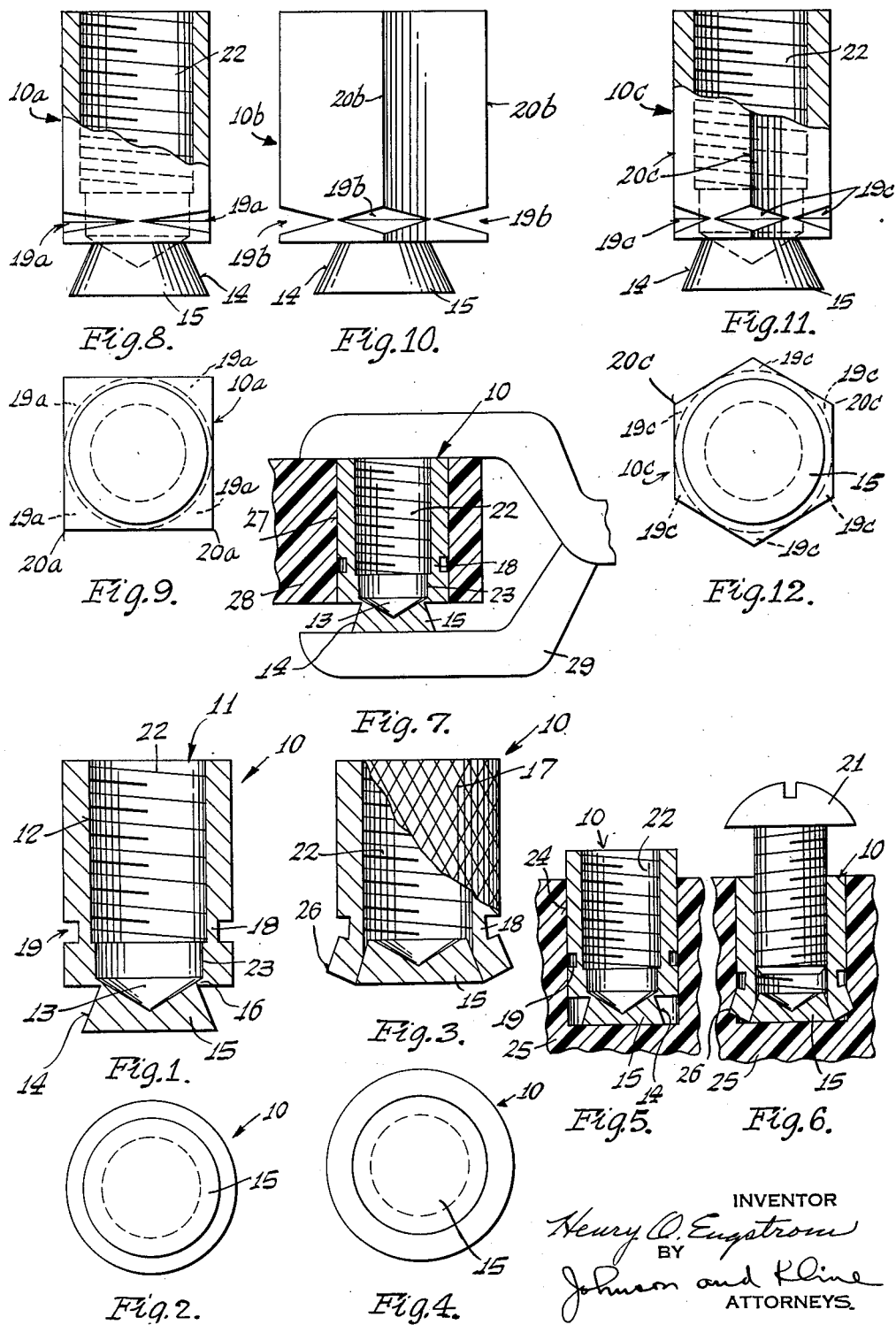

3,089,377
EXPANSION INSERT
Henry O. Engstrom, Fairfield, Conn.
(6 Selleck Place, New Canaan, Conn.)
Filed Sept. 4, 1957, Ser. No. 681,990
1 Claim. (Cl. 85—2.4)

The present invention relates to expansible inserts and more particularly to threaded inserts adapted to be inserted into holes formed in molded plastic, die castings and other soft materials.

Heretofore, efforts have been made to avoid the necessity of molding in inserts, particularly threaded inserts, into plastic and die castings and the like articles. One means for accomplishing this has been to provide an insert adapted to be inserted into a preformed hole, which insert is provided with a split end portion and has a spreader assembled therewith which when operated spreads the split portions into locked relation with the walls of the hole in the member. This device, however, is costly to manufacture since it requires an assembly operation for a two-part bushing and separate spreader and also requires a special tool for effecting the spreading operation.

The present invention overcomes these difficulties by providing a unitary insert which can be readily manufactured on a screw machine and which can be inserted into a preformed hole and locked in position without the necessity of requiring special tools.

This is accomplished by providing the insert with a bore extending substantially therethrough and having an integral expander plug connected to overlie the bore and provided with an inclined external wall portion extending under the end of the bore in such a manner as to leave a thin frangible wall between the end of the inclined portion and the end of the bore whereby, upon axial pressure being applied to the insert, it will automatically cause the frangible wall of the insert to fracture and the expander plug to enter the bore and expand the end of the body uniformly and radially outwardly into tight frictional or other gripping engagement with the walls of the hole to lock the insert in place.

A feature of the invention resides in the fact that the unitary insert can be readily assembled into holes in a member in which the insert is to be located and expanded by the use of the usual hammer, press plunger or other pressure applying device.

Another feature of the invention resides in the fact that the insert can be made of brass, aluminum, stainless steel or the like material as the needs of the application thereof dictate.

A further feature of the invention resides in the fact that the insert is a unitary structure which requires no assembly and can be made automatically and at a high speed in a screw machine or the like device.

Other features and advantages of the invention will be apparent from the specification and claim when considered in connection with the drawings in which:

FIGURE 1 shows a sectional view of a cylindrical insert.

FIG. 2 is a bottom view of the insert.

FIG. 3 is a view partly in section of the insert in its applied condition.

FIG. 4 is a bottom view of FIG. 3.

FIG. 5 shows the insert in position in a hole in a plastic member prior to expansion thereof.

FIG. 6 is a view similar to FIG. 5 showing the insert expanded and a bolt threaded into the insert.

FIG. 7 shows the insert in position to be applied to a hole extending through a plastic member.

FIG. 8 shows an insert of rectangular form.

FIG. 9 is a bottom view of FIG. 8.

FIGS. 10 and 11 show inserts of octagonal and hexagonal form respectively.

FIG. 12 is a bottom view of FIG. 11.

As shown in the drawings, the insert of the present invention comprises a body 10 having a bore 11 therein. The bore is preferably formed by drilling a hole 12 axially into the body from one end thereof and terminating in an inner end 13 adjacent the lower end of the body. At the lower end of the body and below the inner end 13 of the bore, the side of the body is provided with an annularly V-shaped cut which produces an inclined wall 14 on the exterior surface of an expander plug 15. As will be noted in FIG. 1, the inclined wall 14 extends inwardly under the end of the bore and is connected thereto by a thin frangible annular wall 16 so that when axial pressure is applied to the insert, the pressure will cause the frangible wall 16 to break or fracture and the inclined surfaces of the wall 14 of the expander block or plug 15 to move into the bore and expand the surrounding walls of the body outwardly as shown in FIG. 3.

The exterior of the body can have any required shape. For example, as shown in FIGS. 1–4, it is a cylindrical body and may have its outer surface 17 knurled or otherwise roughened while as shown in FIGS. 8, 10 and 11 it may have a square body 10a, rectangular body 10b or hexagonal body 10c.

If the walls of the body are relatively heavy, then the present invention provides means to facilitate the expansion of the end of the body into locked relation. As shown in the drawings, this comprises forming the body with a thin uniform wall 18 surrounding the bore at a point adjacent the inner end of the bore. As shown in FIGS. 1 and 3, this is accomplished by providing an exterior annular cut 19 in the body to reduce the wall of the body to the thin wall thickness at this point. In the form of the invention shown in FIGS. 8, 10 and 11 it comprises forming cuts 19a, 19b and 19c in the longitudinal edges 20a, 20b, 20c of the square, octagonal or hexagonal bodies respectively so as to produce a thin wall 18 of uniform section at this point.

While the insert may be used as a guide means for any purpose for which a bushing may be utilized, in the herein illustrated form of the invention the insert is employed as a means for providing a tapped hole for securing a stud or fastener such as a bolt 21 or the like. To this end the insert is provided with a thread 22 in the bore 11 extending from the open end thereof and terminating adjacent the inner end of the bore. Preferably there is provided a smooth cylindrical surface 23 at the inner end of the bore which cooperates with the expander plug 15 when the frangible wall is broken and the inclined surface of the expander plug is moved into the bore to provide a uniform contact therewith and a uniform radial expansion of the surrounding body at the end thereof.

In use, the insert can be inserted into a preformed hole 24 which can be molded, drilled or otherwise formed in a member 25 which may be made of softer material than the insert, a die cast structure or a molded plastic as illustrated.

The insert is first put in position in the hole, as shown in FIG. 5, with the end of the body 10 forming the expander plug 15 engaging the bottom of the hole. Axial pressure is then applied to the opposite end of the body as by a hammer blow or by a press plunger or any other pressure means and the body will move toward the expander plug causing the fracturing of the frangible wall 16. Thereafter, continued pressure will cause the plug to move into the bore 11 to the position shown in FIG. 6 and the inclined walls to cause the end of the body to flare out to frictionally grip the walls of the hole 24. Also, the sharp edges 26, the edges 20a, 20b or 20c of the body and the knurling 17 bite into the member and anchor the insert in position as a result of the expansion of the end thereof.

While the insert as shown in FIGS. 5 and 6 terminates flush with the outer surface of the member 25, it is to be understood that the location of the outer end of the insert can be made at any desired point projecting beyond or recessed within the surface of the member by selecting a proper length of body.

In cases where the insert is to be applied to a hole 27 passing through a thin wall 28, the insert of the proper length is positioned in the hole in the wall as shown in FIG. 7 and pressure means, such as pliers 29, tongs or the like, can be applied thereto to exert axial pressure sufficient to cause the frangible wall 16 to fracture and the expander plug 15 to be moved into the bore and expand the end of the body into holding engagement with the walls of the member.

From the foregoing it will be seen that I have provided a novel insert which can be readily manufactured as a unitary structure and which can be readily inserted and anchored in preformed holes without the necessity of special tools or expanding members which must be assembled therewith.

Variations and modifications may be made within the scope of the claim and portions of the improvements may be used without others.

I claim:

A unitary insert adapted to be inserted and anchored in a hole formed in a member comprising a body having a threaded bore therein opening on the end thereof and terminating in a smooth inner end portion adjacent the other end of the body, said inner end portion being formed with a conical taper at the end thereof, and an integral substantially solid expander plug carried by the body and overlying the inner end portion of the bore, said expander plug having an inclined surface disposed around the exterior thereof adjacent the end of the body and extending under and separated from the inner end portion of said bore by a thin frangible wall formed by said conical taper extending into said plug and cooperating with said inclined surface, whereby axial pressure on the insert causes said wall to break and the inclined surface to move into the end of the bore and uniformly expand the end of the body into anchored relation with the walls of said hole, said body having an annular exterior cut extending therearound and forming a thin uniform wall portion surrounding the bore adjacent said smooth inner end portion to facilitate said expansion of the body.

References Cited in the file of this patent

UNITED STATES PATENTS

| | | |
|---|---|---|
| 1,164,322 | Yeatman | Dec. 14, 1915 |
| 1,227,627 | Kennedy | May 29, 1917 |
| 1,621,598 | Phillips | Mar. 22, 1927 |
| 1,808,318 | Pleister | June 2, 1931 |
| 1,934,232 | Keuffel | Nov. 7, 1933 |
| 2,102,230 | Waterman | Dec. 14, 1937 |

FOREIGN PATENTS

| | | |
|---|---|---|
| 5,667 | Great Britain | Mar. 17, 1905 |